United States Patent
Strandborg et al.

(10) Patent No.: US 12,432,334 B2
(45) Date of Patent: Sep. 30, 2025

(54) GAZE-ASSISTED IMAGE CAPTURE AND STEREO REPROJECTION

(71) Applicant: Varjo Technologies Oy, Helsinki (FI)

(72) Inventors: Mikko Strandborg, Helsinki (FI); Mikko Ollila, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 124 days.

(21) Appl. No.: 18/481,270

(22) Filed: Oct. 5, 2023

(65) Prior Publication Data

US 2025/0119524 A1    Apr. 10, 2025

(51) Int. Cl.
*H04N 23/00* (2023.01)
*H04N 13/383* (2018.01)
*H04N 23/695* (2023.01)

(52) U.S. Cl.
CPC ......... *H04N 13/383* (2018.05); *H04N 23/695* (2023.01)

(58) Field of Classification Search
CPC ............................. H04N 13/383; H04N 23/695
See application file for complete search history.

(56) References Cited

U.S. PATENT DOCUMENTS

| | | | | |
|---|---|---|---|---|
| 5,267,331 A * | 11/1993 | Siwoff | ................ | G09B 21/008 348/E13.067 |
| 5,359,675 A * | 10/1994 | Siwoff | ................ | H04N 19/597 348/E13.067 |
| 5,526,178 A * | 6/1996 | Goldstein | ............ | A42B 1/247 359/399 |
| 6,591,008 B1 * | 7/2003 | Surve | ................ | G06T 5/90 382/167 |
| 6,611,618 B1 * | 8/2003 | Peli | ................ | G06T 5/73 382/199 |
| 8,130,263 B2 * | 3/2012 | Chang | ................ | H04N 9/3182 359/630 |
| 8,311,328 B2 * | 11/2012 | Spruck | ................ | G06T 5/92 382/172 |
| 9,063,352 B2 * | 6/2015 | Ford | ................ | G02C 7/044 |
| 9,077,915 B2 * | 7/2015 | Kolstad | ................ | H04N 23/20 |
| 2004/0013314 A1 * | 1/2004 | Peli | ................ | G06T 5/10 382/254 |
| 2004/0136570 A1 * | 7/2004 | Ullman | ................ | G06T 5/75 382/114 |
| 2009/0195652 A1 * | 8/2009 | Gal | ................ | B60R 1/28 348/148 |
| 2011/0164122 A1 * | 7/2011 | Hardacker | ............ | H04N 13/398 348/56 |
| 2016/0137129 A1 * | 5/2016 | Mawhinney | .......... | B60R 1/26 348/148 |

* cited by examiner

*Primary Examiner* — Frank F Huang

(74) *Attorney, Agent, or Firm* — ZIEGLER IP LAW GROUP, LLC.

(57) ABSTRACT

Image data is read out from a left part (LL) of a left field of view (FOV) of a left image sensor (L) and a right part (RR) of a right FOV of a right image sensor (R). The left part of the left FOV extends horizontally towards a right side of a gaze point (X) till only a first predefined angle (N1) from the gaze point. The right part of the right FOV extends horizontally towards a left side of a gaze point (X) till only a second predefined angle (N2) from the gaze point. The image data is processed to construct a left part of a left image and a right part of a right image. A right part of the left image and a left part of the right image are reconstructed using image reprojection. The left image and the right image are generated by combining respective parts.

15 Claims, 5 Drawing Sheets

GAZE-ASSISTED IMAGE CAPTURE AND STEREO REPROJECTION

TECHNICAL FIELD

The present disclosure relates to imaging systems that employ gaze-assisted image capture and stereo reprojection. The present disclosure also relates to imaging methods that employ gaze-assisted image capture and stereo reprojection.

BACKGROUND

Extended Reality (XR) technology has revolutionized immersive digital experiences but presents significant computational challenges. XR systems typically employ distinct buffers for each eye to create immersive experiences. This involves capturing and constructing unique and separate images for each eye using its respective image sensor, which is resource-intensive. However, while these techniques provide immersive visuals, they demand substantial computational resources, often taxing GPUs and CPUs. Such resource-intensive image construction can result in performance bottlenecks, including latency issues and reduced frame rates, which compromise the overall quality of the XR experience.

In light of the above-mentioned, innovative solutions are needed to improve image generation efficiency, so as to enhance the performance and user satisfaction of XR systems.

SUMMARY

The aim of the present disclosure is to provide imaging systems and imaging methods that are capable of capturing images in a highly efficient manner. The aim of the present disclosure is achieved by imaging systems and imaging methods in which only a left part of a left image and a right part of a right image are captured from image sensors, while a right part of the left image and a left part of the right image are reconstructed, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
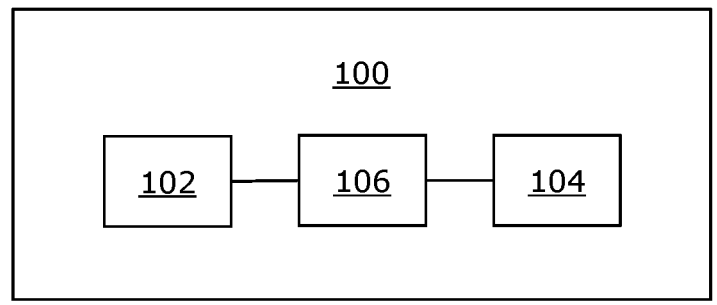
FIG. 1 is a schematic diagram of an imaging system, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides an imaging system comprising:
  a left image sensor and a right image sensor, forming a stereo pair; and
  at least one processor configured to:
    obtain information indicative of a left gaze direction and a right gaze direction of a left eye and a right eye of a user, respectively;
    determine a gaze point of a left field of view (FOV) of the left image sensor and a gaze point of a right FOV of the right image sensor, based on the left gaze direction and the right gaze direction, respectively;
    read out left image data and right image data from the left image sensor and the right image sensor, respectively, wherein the left image data is read out from a left part of the left FOV, wherein the left part of the left FOV extends horizontally towards a right side of the gaze point of the left FOV till only a first predefined angle from the gaze point of the left FOV, while the right image data is read out from a right part of the right FOV, wherein the right part of the right FOV extends horizontally towards a left side of the gaze point of the right FOV till only a second predefined angle from the gaze point of the right FOV;
    process the left image data and the right image data, to construct a left part of a left image and a right part of a right image, respectively;
    reconstruct a right part of the left image, by reprojecting a corresponding part of the right image;
    reconstruct a left part of the right image, by reprojecting a corresponding part of the left image;
    generate the left image, by combining the constructed left part and the reconstructed right part of the left image; and
    generate the right image, by combining the reconstructed left part and the constructed right part of the right image.

In a second aspect, an embodiment of the present disclosure provides an imaging method implemented by an imaging system comprising a left image sensor and a right image sensor, forming a stereo pair, the method comprising:
  obtaining information indicative of a left gaze direction and a right gaze direction of a left eye and a right eye of a user, respectively;
  determining a gaze point of a left field of view (FOV) of the left image sensor and a gaze point of a right FOV of the right image sensor, based on the left gaze direction and the right gaze direction, respectively;

reading out left image data and right image data from the left image sensor and the right image sensor, respectively, wherein the left image data is read out from a left part of the left FOV, wherein the left part of the left FOV extends horizontally towards a right side of the gaze point of the left FOV till only a first predefined angle from the gaze point of the left FOV, while the right image data is read out from a right part of the right FOV, wherein the right part of the right FOV extends horizontally towards a left side of the gaze point of the right FOV till only a second predefined angle from the gaze point of the right FOV;

processing the left image data and the right image data, to construct a left part of a left image and a right part of a right image, respectively;

reconstructing a right part of the left image, by reprojecting a corresponding part of the right image;

reconstructing a left part of the right image, by reprojecting a corresponding part of the left image;

generating the left image, by combining the constructed left part and the reconstructed right part of the left image; and generating the right image, by combining the reconstructed left part and the constructed right part of the right image.

Pursuant to the first aspect and the second aspect of the present disclosure, only the left part of the left image and the right part of the right image are constructed from the left image data and the right image data that has been read out from the left image sensor and the right image sensor, respectively. The right part of the left image and the left part of the right image are reconstructed from their corresponding parts in the opposite images. The left image and the right image are then generated by combining the constructed parts of the images with the reconstructed parts. The aforementioned imaging system and method leverage gaze tracking to optimize an image capturing process, by limiting an area (namely, a part) of an image that is to be captured from a given image sensor. This limitation is achieved by constraining the horizontal FOV towards the other eye to a specific predefined angle from a gaze point of a given FOV of the given image sensor. Missing pixel values for the right part of the left image and the left part of the right image are then reconstructed seamlessly by employing reprojection, whilst aligning the reconstructed parts with their corresponding constructed parts of the images. This compensates for the restricted FOV that was originally captured and ensures that the user perceives a complete and coherent visual representation despite the limited captured area.

Thus, the FOV is optimised for each eye, even though the left part of the left FOV and the right part of the right FOV extend towards the right side of the gaze point of the left FOV and the left side of the gaze point of the right FOV, respectively, up to the first predefined angle and the second predefined angle only. This increases a frame rate at which the images can be generated, thereby enabling real-time or near real-time image generation with minimal latency. As a result, a synchronized, seamless and immersive visual experience is provided to the user.

There will now be considered an example where the first predefined angle and the second predefined angle are equal to 10 degrees. For the left image sensor, pixels that are 10 degrees or more towards the right side of the gaze point in the left FOV are not read out directly from the left image sensor. Instead, their pixel values are reconstructed using the corresponding part of the right image captured by the right image sensor. Similarly, for the right image sensor, pixels that are 10 degrees or more towards the left side of the gaze point in the right FOV are not read out directly from the right image sensor; instead, their pixel values are reconstructed using the corresponding part of the left image captured by the left image sensor. This approach provides several benefits. Firstly, it allows the imaging system to reduce the number of pixels that need to be read out from the left image sensor and the right image sensor for generating a pair of stereo images, potentially resulting in up to 50% fewer pixels being read out, depending on chosen values of the first predefined angle and the second predefined angle. Secondly, the savings obtained are not constant across all view spaces, but are dependent on the left gaze direction and the right gaze direction. However, in gaze-centred views, where the gaze point is at a centre of the FOV, the savings are constant, allowing for exclusion of a discrete part of the FOV.

Pursuant to the first aspect and the second aspect, a primary objective is to provide an improved stereoscopic experience based on the user's gaze direction, whilst optimizing a performance of the imaging system (for example, in terms of the frame rate). The information indicative of the left gaze direction and the right gaze direction can be obtained from a display apparatus of the user. Said information can be generated by the display apparatus using gaze-tracking means. The gaze-tracking could be implemented as light sensors and/or cameras that are employed to collect gaze-tracking data concerning the left gaze direction and the right gaze direction. As an example, the gaze tracking data can be in a form of images of the user's eyes as captured by the cameras. The gaze-tracking data is processed to accurately determine the left gaze direction and the right gaze direction, which are vital for the subsequent processing steps. Such gaze-tracking is well known in the art.

In some implementations, the display apparatus could be employed as a head-mounted display (HMD) device. In other implementations, the display apparatus could be employed as a combination of an HMD device and a computing device that is communicably coupled to the HMD. The term "head-mounted display device" refers to a display device that is employed to present an XR environment to the user when said HMD device, in operation, is worn by the user on his/her head. The HMD device can be implemented, for example, as an XR headset, a pair of XR glasses, and the like, that is operable to display a visual scene of the XR environment to the user.

The gaze point of the left FOV of the left image sensor and the gaze point of the right FOV of the right image sensor can be determined by mapping the left gaze direction and the right gaze direction onto the left FOV and the right FOV, respectively. The left image data and the right image data is then read out from the left part of the left FOV of the left image sensor and the right part of the right FOV of the right image sensor, respectively, extending until the first predefined angle and the second predefined angle from their respective gaze points.

The left image data and the right image data are then processed to construct the left part of the left image and the right part of the right image. Such processing could be performed by employing demosaicking and optionally other image signal processing (ISP) techniques. Such processing of image data is well known in the art. It will be appreciated that the left part of the left image and the right part of the right image can be polygonal (for example, rectangular, or similar) or curved (for example, elliptical, circular, or similar) in shape, providing versatility in adjusting the stereoscopic effect.

Pursuant to the present disclosure, the left part of the left image extends from a gaze point of the left image towards its right side until the first predefined angle only. Similarly, the right part of the right image extends from a gaze point of the right image towards its left side until the second predefined angle only. This ensures that the left part of the left image and the right part of the right image are constructed according to the user's gaze directions, whilst taking into account the first predefined angle and the second predefined angle. This, in turn, ensures that an entirety of the left image and an entirety of the right image can be generated accurately, by taking advantage of a fact that the left image and the right image complement each other stereoscopically.

Throughout the present disclosure, the term "FOV" refers to an angular extent of a region of an environment that can be observed by the user's eyes, wherein the horizontal FOV covers a left-to-right span of said region. It will also be appreciated that the first predefined angle can be same as or different from the second predefined angle. The first predefined angle and the second predefined angle can be customized independently. The first predefined angle and the second predefined angle lie can be any angle smaller than or equal to a half of the horizontal FOV. This ensures that the limitation applied on the angular extent of the rendered parts is comfortable and does not impair the user's viewing experience. More optionally, the first predefined angle and the second predefined angle lie within a range of 2 degrees to 22.5 degrees. The lower bound of this range corresponds to a typical angular width of a gaze region of an FOV of the user whose image is focused at a fovea of the user's eye. This means that the image parts can be finely adjusted to ensure a precise alignment with the user's gaze direction, whilst enhancing the stereoscopic experience. Conversely, the upper bound of the range corresponds to a half of a typical angular width of a region of interest in the FOV of the user. Setting the upper bound at 22.5 degrees allows for more flexible configurations, thereby permitting variations in the stereoscopic display of the left image and the right image to accommodate different applications. Overall, this range enables to tailor the stereoscopic display with utmost precision, whilst still maintaining the flexibility to accommodate different angular widths beyond the gaze point, all of which ultimately contribute to an improved and immersive user experience.

Furthermore, the right part of the left image is reconstructed by reprojecting the corresponding part of the right image, and the left part of the right image is reconstructed by reprojecting the corresponding part of the left image. Such a reprojection can be performed by employing any one of: a three degrees-of-freedom (3DOF) reprojection, a six degrees-of-freedom (6DOF) reprojection, a nine degrees-of-freedom (9DOF) reprojection. Image reprojection is well known in the art.

It will be appreciated that the reprojection process may exhibit image artifacts as a result of disocclusions; however, as the reprojection is only used for a peripheral part of the horizontal FOV, such artifacts are not noticeable to the user. Moreover, originally-captured parts of the left image and the right image (namely, the left part of the left image and the right part of the right image) are displayed to the left eye and the right eye; therefore, any artifacts resulting from the reprojection process are unnoticeable to the user, because of an inherent capability of a human brain to combine of the left image and the right image to generate a combined image. Furthermore, a synchronized, seamless and immersive visual experience is provided to the user, even if a blind spot is created directly between the perspectives of the left image sensor and the right image sensor; these technical benefits arise from a fact that the user's gaze has converged further away in a given visual scene than the blind spot, which, in turn, means that the blind spot between the gaze point and the user's eyes are unobstructed.

Following the image reprojection, the constructed left part of the left image is combined with the reconstructed right part of the left image to generate the left image, and the reconstructed left part of the right image is combined with the constructed right part of the right image to generate the right image. Such combining aligns the image parts seamlessly, thereby contributing to coherent and natural stereoscopic images. It will be appreciated that such combining can be performed by employing an image stitching technique. Image stitching techniques are well known in the art.

In some implementations, the at least one processor of the imaging system could be implemented as at least one server, which is configured to serve at least one display apparatus. In such implementations, the at least one processor could be configured to send the left image and the right image to the at least one display apparatus for display thereat. In other implementations, the at least one processor of the imaging system could be implemented as a processor of a computing device that is communicably coupled to a head-mounted display apparatus. In such implementations, the head-mounted display apparatus and the computing device could constitute a display apparatus.

Furthermore, optionally, when reading out the left image data, the at least one processor is configured to employ spatially-variable subsampling across the left FOV, wherein a subsampling density employed for a gaze region surrounding the gaze point of the left FOV is higher than a subsampling density employed for a remaining region of the left FOV. Likewise, optionally, when reading out the right image data, the at least one processor is configured to employ spatially-variable subsampling across the right FOV, wherein a subsampling density employed for a gaze region surrounding the gaze point of the right FOV is higher than a subsampling density employed for a remaining region of the right FOV.

The remaining region can be considered as a peripheral region that surrounds the gaze region. An angular width of the gaze region could lie in a range of 5 degrees to 45 degrees. The term "subsampling density" refers to a number of pixels that are read out per unit area or per unit array of pixels. As an example, the subsampling density employed for the gaze region could be 75 percent, meaning that 3 out of 4 pixels are read out in the gaze region, while the subsampling density employed for the remaining region could be 25 percent, meaning that 1 out of 4 pixels are read out in the peripheral region.

A technical benefit of employing a higher subsampling density in the gaze region as compared to the remaining region is that when the left image data and the right image data are processed to construct the left part of the left image and the right part of the right image, respectively, a gaze region in the left part of the left image and a gaze region in the right part of the right image have a resolution that is higher than a resolution of a remaining region in the left part of the left image and a remaining region in the right part of the right image. Subsampling the image data in this manner allows to increase the frame rate at which the images can be generated, without affecting an overall perceivable image quality. This is because the images so generated are gaze-contingent, and the user is not able to perceive the lower resolution of the remaining region.

It will be appreciated that in some alternative implementations, the subsampling may be performed only in the remaining region, while the image data is sampled almost fully in the gaze region. Moreover, in some implementations, only one of the left image data and the right image data may be subsampled, while another of the left image data and the right image data may not be subsampled.

Moreover, pursuant to embodiments, the left image data and the right image data can be read out from the left image sensor and the right image sensor by simply adjusting a read-out crop setting of the left image sensor and a read-out crop setting of the right image sensor, based on the gaze point of the left FOV and the first predefined angle, and the gaze point of the right FOV and the second predefined angle, respectively. However, it will be appreciated that if the left image data and the right image data are read out only from the left part of the left FOV and the right part of the right FOV, a major part of the left image sensor and a major part of the right image sensor would go unutilised. The left image sensor and the right image sensor can be utilised efficiently to expand the horizontal FOV in various ways, as described below. Optionally, in this regard, the imaging system further comprises at least one left optical element and at least one right optical element arranged on an optical path of the left image sensor and an optical path of the right image sensor, respectively. The at least one left optical element and/or the at least one right optical element could comprise at least one of: one or more lenses, one or more mirrors.

In a first embodiment, the at least one processor is configured to:
control an orientation of the at least one left optical element to direct, towards the left image sensor, light incoming from an additional left FOV that extends beyond a left side of the left FOV, based on the gaze point of the left FOV; and
control an orientation of the at least one right optical element to direct, towards the right image sensor, light incoming from an additional right FOV that extends beyond a right side of the right FOV, based on the gaze point of the right FOV,
wherein the left image data and the right image data are read out, respectively, from the additional left FOV and the additional right FOV also.

In this regard, the at least one processor could be configured to determine an angular extent of the left part of the left FOV and an angular extent of the right part of the right FOV, based on the gaze point of the left FOV and the gaze point of the right FOV, whilst also taking into consideration the first predefined angle and the second predefined angle. It will be appreciated that the angular extent of the left part of the left FOV and the angular extent of the right part of the right FOV can be very different, especially in cases where the gaze point of the left FOV and the gaze point of the right FOV are not at a centre of the left FOV and a centre of the right FOV, respectively (namely, when the left gaze direction and the right gaze direction are not pointing straight in front of the user). This has been illustrated in conjunction with FIG. 5.

The at least one processor could be configured to determine the additional left FOV and the additional right FOV that can be captured in the left image data and the right image data, based on the angular extent of the left part of the left FOV and the angular extent of the right part of the right FOV. This can be determined trivially, because an actual horizontal FOV of the left image sensor and the right image sensor is known beforehand. The orientation of the at least one left optical element and the orientation of the at least one right optical element can then be controlled accordingly. It will be appreciated that the orientation of the left optical element may be different from the orientation of the right optical element, because they depend on their respective gaze points.

Directing the light incoming from the additional left FOV and the light incoming from the additional right FOV towards the left image sensor and the right image sensor allows to extend the left FOV and the right FOV horizontally towards the left side and the right side, respectively. This not only allows to generate left images and right images that have a larger FOV than an original FOV of the left image sensor and the right image sensor, but also allow to utilise the left image sensor and the right image sensor efficiently. Otherwise, the additional left FOV and the additional right FOV of the left image sensor and the right image sensor would be wasted.

In a second embodiment, the at least one processor is configured to:
control a lateral shift of the left image sensor with respect to the at least one left optical element, based on the gaze point of the left FOV; and
control a lateral shift of the right image sensor with respect to the at least one right optical element, based on the gaze point of the right FOV.

It will be appreciated that an extent of the lateral shift of the left image sensor and an extent of the lateral shift of the right image sensor can be very different, because they depend on their respective gaze points. This is especially true in cases where the gaze point of the left FOV and the gaze point of the right FOV are not at a centre of the left FOV and the right FOV, respectively. As an example, an angular extent of a given lateral shift can be an angular distance lying in a range of 5 degrees to 50 degrees, wherein the angular distance is measured from a perspective of an optical centre of a given optical element that is closest to a given image sensor. The given lateral shift is performed with respect to a regular position in which an optical axis of the given optical element and an optical axis of the given image sensor are aligned. After the given lateral shift is performed, the optical axis of the given image sensor does not align with the optical axis of the given optical element, thereby expanding the FOV captured in a given part of a given image.

Shifting the left image sensor and the right image sensor laterally with respect to the at least one left optical element and the at least one right optical element allow for capturing the additional left FOV and the additional right FOV using the left image sensor and the right image sensor. This allows to extend the left FOV and the right FOV, and enables in not only generating left images and right images that have a larger FOV than an original FOV of the left image sensor and the right image sensor, but also allow to utilise the left image sensor and the right image sensor efficiently.

In a third embodiment, the at least one processor is configured to:
adjust an orientation of the at least one left optical element and the left image sensor towards a left side of the left FOV, based on the gaze point of the left FOV, to enable capture of an additional left FOV that extends beyond the left side of the left FOV; and
adjust an orientation of the at least one right optical element and the right image sensor towards a right side of the right FOV, based on the gaze point of the left FOV, to enable capture of an additional right FOV that extends beyond the right side of the right FOV.

Herein, the orientation of both the given optical element and the given image sensor are adjusted to expand the horizontal FOV, based on the gaze point of the given FOV. The orientation of the at least one left optical element and the left image sensor can be adjusted to a different extent as compared to the orientation of the at least one right optical element and the right image sensor, because they depend on their respective gaze points.

It will be appreciated that the various different ways for expanding the horizontal FOV can be used alone or in any combination. In other words, the aforementioned first embodiment, the aforementioned second embodiment, and the aforementioned third embodiment can be implemented either alone or in any combination thereof.

The present disclosure also relates to the imaging method as described above. Various embodiments and variants disclosed above, with respect to the aforementioned imaging system of the first aspect, apply mutatis mutandis to the imaging method of the second aspect.

Optionally, the imaging system further comprises at least one left optical element and at least one right optical element arranged on an optical path of the left image sensor and an optical path of the right image sensor, respectively. The left image sensor and the right image sensor can be utilised efficiently to expand their horizontal FOV in various ways, as described earlier.

In a first embodiment, the method further comprises:
controlling an orientation of the at least one left optical element to direct, towards the left image sensor, light incoming from an additional left FOV that extends beyond a left side of the left FOV, based on the gaze point of the left FOV; and
controlling an orientation of the at least one right optical element to direct, towards the right image sensor, light incoming from an additional right FOV that extends beyond a right side of the right FOV, based on the gaze point of the right FOV,
wherein the left image data and the right image data are read out, respectively, from the additional left FOV and the additional right FOV also.

In a second embodiment, the method further comprises:
controlling a lateral shift of the left image sensor with respect to the at least one left optical element, based on the gaze point of the left FOV; and
controlling a lateral shift of the right image sensor with respect to the at least one right optical element, based on the gaze point of the right FOV.

In a third embodiment, the method further comprises:
adjusting an orientation of the at least one left optical element and the left image sensor towards a left side of the left FOV, based on the gaze point of the left FOV, to enable capture of an additional left FOV that extends beyond the left side of the left FOV; and
adjusting an orientation of the at least one right optical element and the right image sensor towards a right side of the right FOV, based on the gaze point of the left FOV, to enable capture of an additional right FOV that extends beyond the right side of the right FOV.

Furthermore, in some alternative implementations, some of the aforementioned operations of the imaging system can be performed by a display apparatus or a server. In this regard, there will now be provided some additional aspects.

In a third aspect, an embodiment of the present disclosure provides an imaging system comprising:

a left image sensor and a right image sensor, forming a stereo pair; and
at least one processor configured to:
obtain information indicative of a left gaze direction and a right gaze direction of a left eye and a right eye of a user, respectively;
determine a gaze point of a left field of view (FOV) of the left image sensor and a gaze point of a right FOV of the right image sensor, based on the left gaze direction and the right gaze direction, respectively;
read out left image data and right image data from the left image sensor and the right image sensor, respectively, wherein the left image data is read out from a left part of the left FOV, wherein the left part of the left FOV extends horizontally towards a right side of the gaze point of the left FOV till only a first predefined angle from the gaze point of the left FOV, while the right image data is read out from a right part of the right FOV, wherein the right part of the right FOV extends horizontally towards a left side of the gaze point of the right FOV till only a second predefined angle from the gaze point of the right FOV;
process the left image data and the right image data, to construct a left part of a left image and a right part of a right image, respectively; and
send the left part of the left image and the right part of the right image to at least one server or at least one display apparatus.

In a fourth aspect, an embodiment of the present disclosure provides an imaging method implemented by an imaging system comprising a left image sensor and a right image sensor, forming a stereo pair, the method comprising:
obtaining information indicative of a left gaze direction and a right gaze direction of a left eye and a right eye of a user, respectively;
determining a gaze point of a left field of view (FOV) of the left image sensor and a gaze point of a right FOV of the right image sensor, based on the left gaze direction and the right gaze direction, respectively;
reading out left image data and right image data from the left image sensor and the right image sensor, respectively, wherein the left image data is read out from a left part of the left FOV, wherein the left part of the left FOV extends horizontally towards a right side of the gaze point of the left FOV till only a first predefined angle from the gaze point of the left FOV, while the right image data is read out from a right part of the right FOV, wherein the right part of the right FOV extends horizontally towards a left side of the gaze point of the right FOV till only a second predefined angle from the gaze point of the right FOV;
processing the left image data and the right image data, to construct a left part of a left image and a right part of a right image, respectively; and
sending the left part of the left image and the right part of the right image to at least one server or at least one display apparatus.

The third aspect differs from the first aspect in some ways. In the first aspect, the at least one processor of the imaging system is configured to generate an entirety of the left image and an entirety of the right image. On the other hand, in the third aspect, the at least one processor of the imaging system is configured to construct only the left part of the left image and the right part of the right image. In other words, the entire left image and the entire right image are not generated. This allows for different practical applications and their associated technical benefits.

In implementations in which the left part of the left image and the right part of the right image are sent to the at least one server, the at least one server is configured to:
reconstruct a right part of the left image, by reprojecting a corresponding part of the right image;
reconstruct a left part of the right image, by reprojecting a corresponding part of the left image;
generate the left image, by combining the constructed left part and the reconstructed right part of the left image;
generate the right image, by combining the reconstructed left part and the constructed right part of the right image; and
send the left image and the right image to the at least one display apparatus.

A technical benefit of reconstructing the right part of the left image and the left part of the right image at the at least one server is that the at least one display apparatus does not need to spend its already limited computational resources on the reconstruction process, and can utilise it for other tasks. As the reconstruction process is performed at the at least one server, which already has depth information corresponding to the left image and the right image, the reprojection could be employed using a 6DOF reprojection or a 9DOF reprojection, thereby yielding a better image quality for the reconstructed parts. Optionally, in this regard, the at least one server is configured to access a 3D model of a real-world environment from at least one data repository, and utilise the 3D model to generate the depth information. It will be appreciated that the at least one server can be implemented as a cloud server, or a computing device that is communicably coupled to the display apparatus (for example, an HMD). The at least one data repository could be implemented, for example, such as a memory of the at least one server, a memory of the computing device, a removable memory, a cloud-based database, or similar. Optionally, the system further comprises the at least one data repository, which is communicably coupled to the at least one server.

In such implementations, the at least one server plays a pivotal role in image reconstruction, whilst optimizing the stereoscopic images based on the left gaze direction and the right gaze direction. By delegating specific tasks to the at least one server, the imaging system can focus on capturing the left part of the left image and the right part of the right image, while the at least one display apparatus can focus on efficiently displaying the left image and the right image, thereby enhancing the overall user experience. Thus, the system of the third aspect provides a robust and versatile solution for various applications.

In other implementations in which the left part of the left image and the right part of the right image are sent to the at least one display apparatus, the at least one display apparatus is configured to:
reconstruct a right part of the left image, by reprojecting a corresponding part of the right image;
reconstruct a left part of the right image, by reprojecting a corresponding part of the left image;
generate the left image, by combining the constructed left part and the reconstructed right part of the left image;
generate the right image, by combining the reconstructed left part and the constructed right part of the right image; and
display the left image and the right image.

In cloud-based extended-reality (XR) systems where images are streamed from the imaging system to the at least one display apparatus, such implementations can bring additional network bandwidth savings during a transport process, because only certain parts of the images are required to be transported to the at least one display apparatus. For example, in a case where the imaging system is implemented in a teleport device or an HMD device of a first user, only the left part of the left image and the right part of the right image are required to be sent to the at least one display apparatus (for example, an HMD device of a second user), which then performs the image reprojection at its end. A primary technical benefit of this implementation would be reduced network traffic when only parts of the images are captured by the teleport device or the HMD device of the first user, and sent to the at least one display apparatus (for example, the HMD device of the second user).

It will be appreciated that various steps of the third aspect can be performed in a similar manner as described earlier with respect to the first aspect, and therefore, have not been explained in detail again.

Optionally, the first predefined angle and the second predefined angle lie within a range of 2 degrees to 22.5 degrees.

Optionally, when reading out the left image data, the at least one processor is configured to employ spatially-variable subsampling across the left FOV, wherein a subsampling density employed for a gaze region surrounding the gaze point of the left FOV is higher than a subsampling density employed for a remaining region of the left FOV. Likewise, optionally, when reading out the right image data, the at least one processor is configured to employ spatially-variable subsampling across the right FOV, wherein a subsampling density employed for a gaze region surrounding the gaze point of the right FOV is higher than a subsampling density employed for a remaining region of the right FOV.

Optionally, the imaging system further comprises at least one left optical element and at least one right optical element arranged on an optical path of the left image sensor and an optical path of the right image sensor, respectively. In a first embodiment, the at least one processor is configured to:
control an orientation of the at least one left optical element to direct, towards the left image sensor, light incoming from an additional left FOV that extends beyond a left side of the left FOV, based on the gaze point of the left FOV; and
control an orientation of the at least one right optical element to direct, towards the right image sensor, light incoming from an additional right FOV that extends beyond a right side of the right FOV, based on the gaze point of the right FOV,
wherein the left image data and the right image data are read out, respectively, from the additional left FOV and the additional right FOV also.

In a second embodiment, the at least one processor is configured to:
control a lateral shift of the left image sensor with respect to the at least one left optical element, based on the gaze point of the left FOV; and
control a lateral shift of the right image sensor with respect to the at least one right optical element, based on the gaze point of the right FOV.

In a third embodiment, the at least one processor is configured to:
adjust an orientation of the at least one left optical element and the left image sensor towards a left side of the left FOV, based on the gaze point of the left FOV, to enable capture of an additional left FOV that extends beyond the left side of the left FOV; and adjust an orientation of the at least one right optical element and the right image sensor towards a right side of the right FOV, based on the gaze point of the left FOV, to enable capture of an additional right FOV that extends beyond the right side of the right FOV.

The present disclosure also relates to the method as described above. Various embodiments and variants disclosed above, with respect to the aforementioned imaging system of the third aspect, apply mutatis mutandis to the imaging method of the fourth aspect.

Optionally, in the method, the imaging system further comprises at least one left optical element and at least one right optical element arranged on an optical path of the left image sensor and an optical path of the right image sensor, respectively. In a first embodiment, the method further comprises:

controlling an orientation of the at least one left optical element to direct, towards the left image sensor, light incoming from an additional left FOV that extends beyond a left side of the left FOV, based on the gaze point of the left FOV; and controlling an orientation of the at least one right optical element to direct, towards the right image sensor, light incoming from an additional right FOV that extends beyond a right side of the right FOV, based on the gaze point of the right FOV, wherein the left image data and the right image data are read out, respectively, from the additional left FOV and the additional right FOV also.

In a second embodiment, the method further comprises:

controlling a lateral shift of the left image sensor with respect to the at least one left optical element, based on the gaze point of the left FOV; and controlling a lateral shift of the right image sensor with respect to the at least one right optical element, based on the gaze point of the right FOV.

In a third embodiment, the method further comprises:

adjusting an orientation of the at least one left optical element and the left image sensor towards a left side of the left FOV, based on the gaze point of the left FOV, to enable capture of an additional left FOV that extends beyond the left side of the left FOV; and adjusting an orientation of the at least one right optical element and the right image sensor towards a right side of the right FOV, based on the gaze point of the left FOV, to enable capture of an additional right FOV that extends beyond the right side of the right FOV.

DETAILED DESCRIPTION OF THE DRAWINGS

Referring to FIG. 1, illustrated is a schematic diagram of an imaging system 100, in accordance with an embodiment of the present disclosure. The imaging system 100 comprises a left image sensor 102 and a right image sensor 104, forming a stereo pair, and at least one processor (depicted as a processor 106). The processor 106 is communicably coupled to the left image sensor 102 and the right image sensor 104. The processor 106 could be configured to perform various operations according to the aforementioned first aspect or the aforementioned third aspect, as described earlier.

It may be understood by a person skilled in the art that FIG. 1 includes a simplified architecture of the imaging system 100, for the sake of clarity, which should not unduly limit the scope of the claims herein. It is to be understood that the specific implementation of the imaging system 100 is provided as an example and is not to be construed as limiting it to specific numbers or types of image sensors and processors. The person skilled in the art will recognize many variations, alternatives, and modifications of embodiments of the present disclosure.

Figure 2:
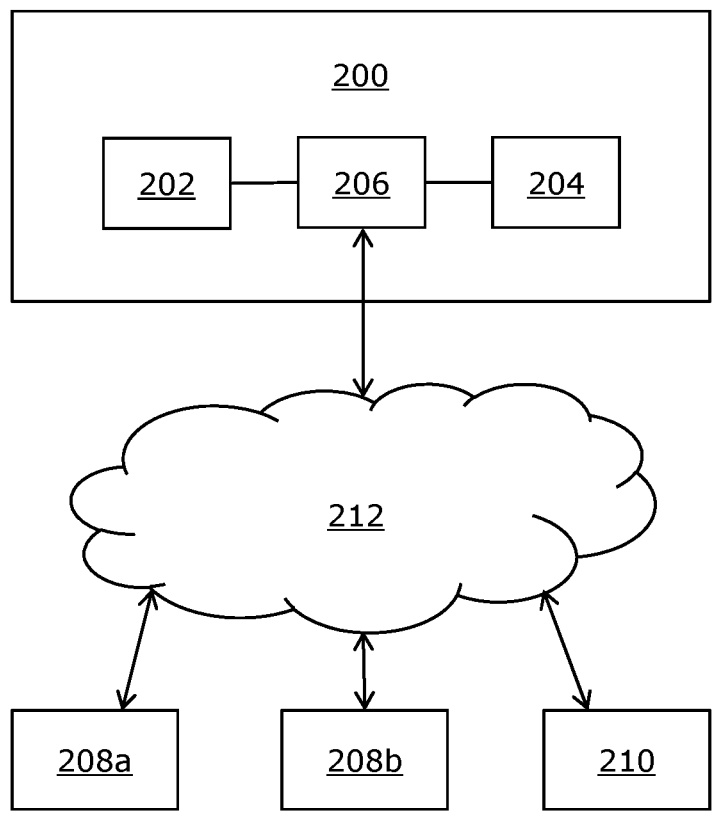
FIG. 2 is a schematic diagram of a network environment in which an imaging system can be implemented, in accordance with an embodiment of the present disclosure.

FIG. 2 illustrates a schematic diagram of a network environment in which an imaging system 200 can be implemented, in accordance with an embodiment of the present disclosure. The imaging system 200 comprises a left image sensor 202 and a right image sensor 204, forming a stereo pair, and at least one processor (depicted as a processor 206). The processor 200 of the imaging system 200 could be communicably coupled to at least one display apparatus (depicted as a display apparatuses 208a-b) and/or at least one server (depicted as a server 210), for example, via a communication network 212. The processor 206 is configured to perform various operations according to the aforementioned third aspect, as described earlier.

It may be understood by a person skilled in the art that FIG. 2 illustrates a simplified block diagram of the network environment, for the sake of clarity, which should not unduly limit the scope of the claims herein. It is to be understood that the specific implementation of the imaging system 200 is provided as an example and is not to be construed as limiting it to specific numbers or types of image sensors, processors, display apparatuses, servers and communication networks. The person skilled in the art will recognize many variations, alternatives, and modifications of embodiments of the present disclosure.

Figure 3:
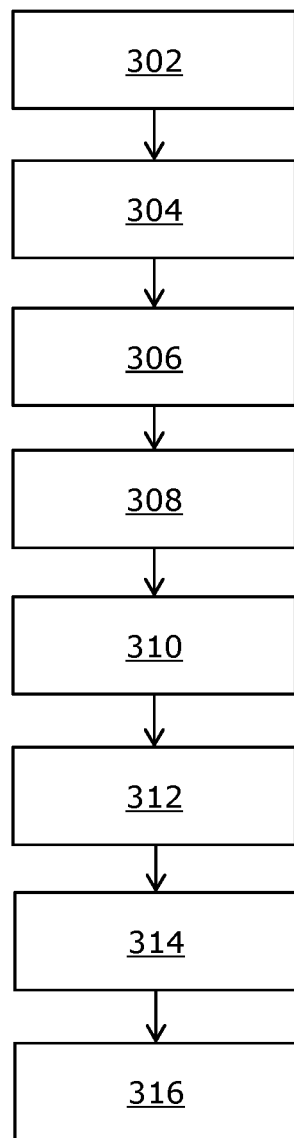
FIG. 3 illustrates steps of an imaging method implemented by an imaging system comprising a left image sensor and a right image sensor, forming a stereo pair, in accordance with an embodiment of the present disclosure.

FIG. 3 illustrates steps of an imaging method implemented by an imaging system comprising a left image sensor and a right image sensor, forming a stereo pair, in accordance with an embodiment of the present disclosure. At a step 302, information indicative of a left gaze direction and a right gaze direction of a left eye and a right eye of a user, respectively, are obtained. At a step 304, a gaze point of a left FOV of the left image sensor and a gaze point of a right FOV of the right image sensor are determined, based on the left gaze direction and the right gaze direction, respectively. At a step 306, left image data and right image data are read out from the left image sensor and the right image sensor, respectively, wherein the left image data is read out from a left part of the left FOV, wherein the left part of the left FOV extends horizontally towards a right side of the gaze point of the left FOV till only a first predefined angle from the gaze point of the left FOV, while the right image data is read out from a right part of the right FOV, wherein the right part of the right FOV extends horizontally towards a left side of the gaze point of the right FOV till only a second predefined angle from the gaze point of the right FOV. At a step 308, the left image data and the right image data are processed to construct a left part of a left image and a right part of a right image, respectively. At a step 310, a right part of the left image is reconstructed by reprojecting a corresponding part of the right image. At a step 312, a left part of the right image is reconstructed by reprojecting a corresponding part of the left image. At a step 314, the left image is generated by combining the constructed left part and the reconstructed right part of the left image. At a step 316, the right image is generated by combining the reconstructed left part and the constructed right part of the right image.

The aforementioned steps are only illustrative and other alternatives can also be provided where one or more steps are added, one or more steps are removed, or one or more steps are provided in a different sequence without departing from the scope of the claims. As an example, the steps 310 and 312 can be performed simultaneously. As another example, the steps 314 and 316 can be performed simultaneously.

Figure 4:
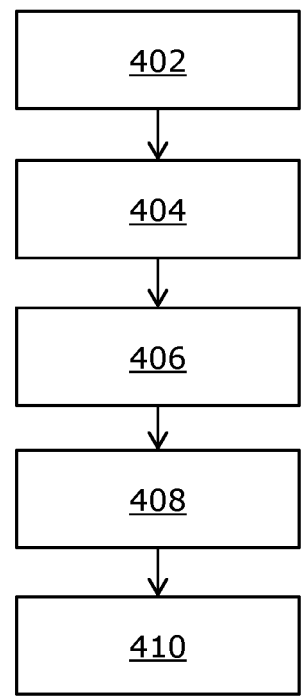
FIG. 4 illustrates steps of an imaging method implemented by an imaging system comprising a left image sensor and a right image sensor, forming a stereo pair, in accordance with another embodiment of the present disclosure.

FIG. 4 illustrates steps of an imaging method implemented by an imaging system comprising a left image sensor and a right image sensor, forming a stereo pair, in accordance with another embodiment of the present disclosure. At a step 402, information indicative of a left gaze direction and a right gaze direction of a left eye and a right eye of a user, respectively, is obtained. At a step 404, a gaze point of a left FOV of the left image sensor and a gaze point of a right FOV of the right image sensor is determined, based on the left gaze direction and the right gaze direction, respectively. At a step 406, left image data and right image data are read out from the left image sensor and the right image sensor, respectively, wherein the left image data is read out from a left part of the left FOV, wherein the left part of the left FOV extends horizontally towards a right side of the gaze point of the left FOV till only a first predefined angle from the gaze point of the left FOV, while the right image data is read out from a right part of the right FOV, wherein the right part of the right FOV extends horizontally towards a left side of the gaze point of the right FOV till only a second predefined angle from the gaze point of the right FOV. At a step 408, the left image data and the right image data are processed, to construct a left part of a left image and a right part of a right image, respectively. At a step 410, the left part of the left image and the right part of the right image are sent to at least one server or at least one display apparatus.

The aforementioned steps are only illustrative and other alternatives can also be provided where one or more steps are added, one or more steps are removed, or one or more steps are provided in a different sequence without departing from the scope of the claims.

Figure 5:
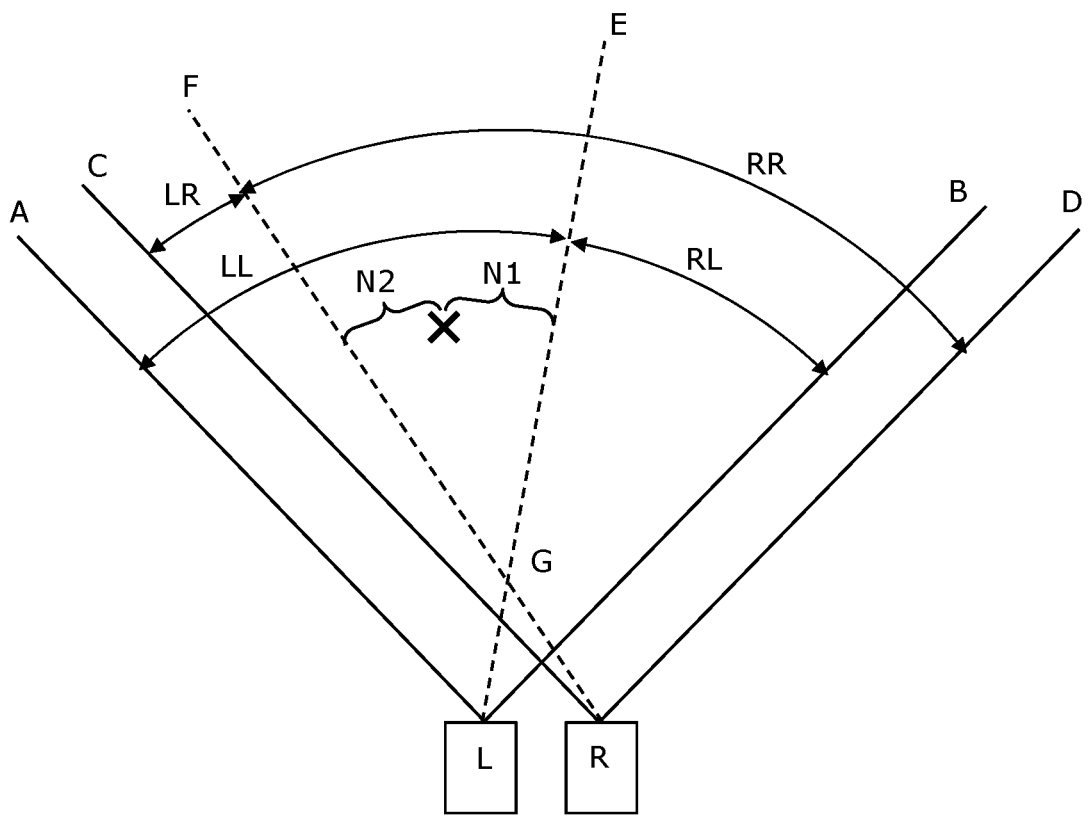
FIG. 5 is a schematic diagram of a horizontal angular extent of a left field of view and a right field of view, in accordance with an embodiment of the present disclosure.

FIG. 5 is a schematic diagram of a horizontal angular extent of a left FOV and a right FOV, in accordance with an embodiment of the present disclosure. A horizontal FOV of a left image sensor L and a horizontal FOV for a right image sensor R are depicted with an angle ALB and an angle CRD, respectively. A gaze point of the left FOV and a gaze point of the right FOV are depicted with a point X. An angular extent of a left part LL of the left FOV is depicted with an angle ALE, wherein the left part LL of the left FOV extends towards a right side of the gaze point X of the left FOV till only a first predefined angle N1 from the gaze point X of the left FOV. Likewise, an angular extent of a right part RR of the right FOV is depicted with an angle FRD, wherein the right part RR of the right FOV extends towards a left side of the gaze point X of the right FOV till only a second predefined angle N2 from the gaze point X of the right FOV.

With respect to FIG. 5, the angular extent of the left part LL of the left FOV (namely, the angle ALE) and the angular extent of the right part RR of the right FOV (namely, the angle FRD) are different. This is because the gaze point X of the left FOV and the gaze point X of the right FOV are not at a centre of the left FOV and a centre of the right FOV, respectively (namely, when the left gaze direction and the right gaze direction are not pointing straight in front of the user).

An angular extent of a right part RL of the left FOV is depicted with an angle ELB, while an angular extent of a left part LR of the right FOV is depicted with an angle CRF. As described earlier, a right part of a left image (corresponding to the right part RL of the left FOV) and a left part of a right image (corresponding to the left part LR of the right FOV) are reconstructed from a corresponding part of the right image and a corresponding part of the left image, respectively.

A blind spot in the FOV can be depicted as a region LGR. A synchronized, seamless and immersive visual experience is provided to the user, even if the blind spot is created directly between the perspectives of the left image sensor L and the right image sensor R. These technical benefits arise from a fact that the user's gaze has converged further away in a given visual scene than the blind spot, which, in turn, means that the blind spot between the gaze point X and the image sensors is unobstructed.

Figure 6A:
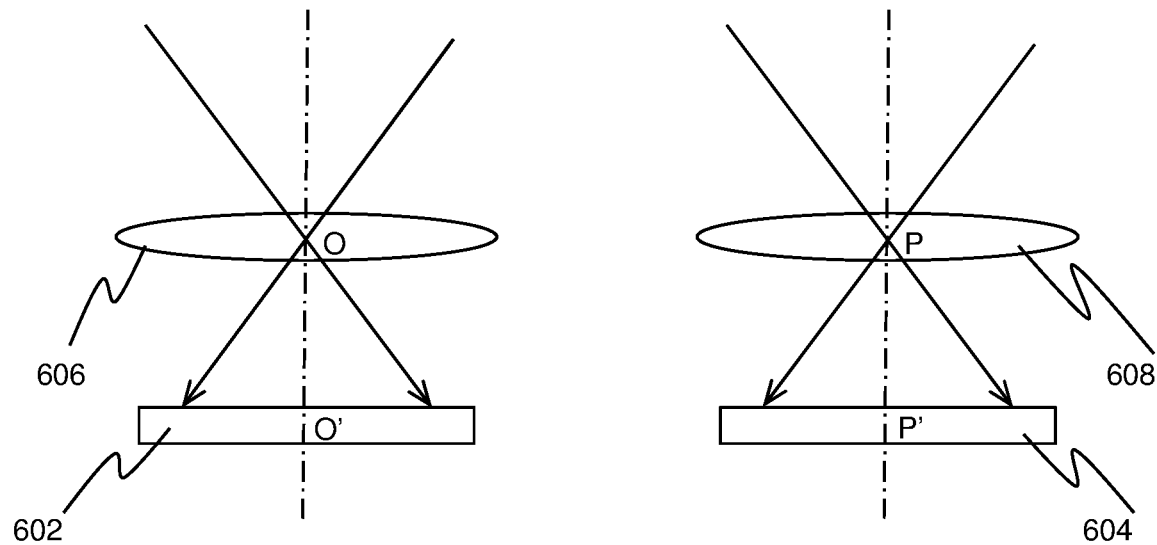
FIGS. 6A and 6B are schematic diagrams depicting how a horizontal field of view of a given image sensor can be expanded, in accordance with an embodiment of the present disclosure.
Figure 6B:
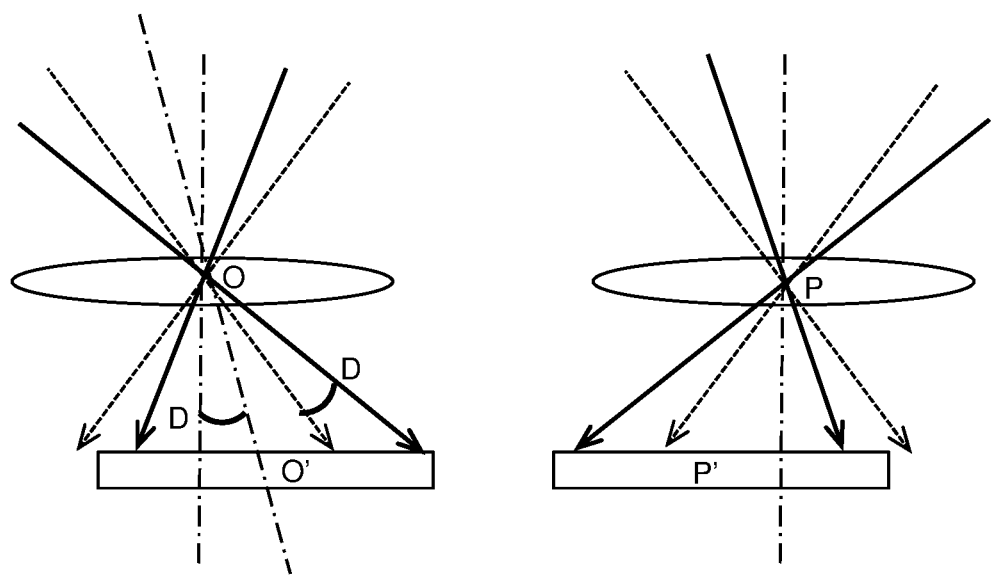

FIGS. 6A and 6B are schematic diagrams depicting how a horizontal FOV of a given image sensor can be expanded, in accordance with an embodiment of the present disclosure. There are shown a left image sensor 602, a right image sensor 604, at least one left optical element (depicted as a left optical element 606), and at least one right optical element (depicted as a right optical element 608).

With reference to FIG. 6A, an optical centre O' of the left image sensor 602 is aligned with an optical centre O of the left optical element 606, while an optical centre P' of the right image sensor 604 is aligned with an optical centre P of the right optical element 608. Rays shown in FIG. 6A represent an original horizontal FOV of the left image sensor 602 and the right image sensor 604.

With reference to FIG. 6B, the left image sensor 602 is shifted laterally with respect to the left optical element 606, while the right image sensor 604 is shifted laterally with respect to the right optical element 608. Note that the lateral shift for the left image sensor 602 is in an opposite direction as compared to the lateral shift for the right image sensor 604. Such a lateral shift allows for expanding the horizontal FOV of images generated using the left image sensor 602 and the right image sensor 604.

In FIG. 6B, the original horizontal FOV of the left image sensor 602 and the right image sensor 604 is shown with dotted lines, while a new horizontal FOV of the left image sensor 602 and the right image sensor 604 is shown with solid lines. An angle D is formed between a central axis of the new horizontal FOV and a central axis of the original horizontal FOV. This angle D depicts an angular extent of the lateral shift.

FIGS. 5 and 6A-6B are merely examples, which should not unduly limit the scope of the claims herein. A person skilled in the art will recognize many variations, alternatives, and modifications of embodiments of the present disclosure.

The invention claimed is:

1. An imaging system comprising:
a left image sensor and a right image sensor, forming a stereo pair; and
at least one processor configured to:
obtain information indicative of a left gaze direction and a right gaze direction of a left eye and a right eye of a user, respectively;
determine a gaze point of a left field of view (FOV) of the left image sensor and a gaze point of a right FOV of the right image sensor, based on the left gaze direction and the right gaze direction, respectively;
read out left image data and right image data from the left image sensor and the right image sensor, respectively, wherein the left image data is read out from a left part of the left FOV, wherein the left part of the left FOV extends horizontally towards a right side of the gaze point of the left FOV till only a first predefined angle from the gaze point of the left FOV, while the right image data is read out from a right part of the right FOV, wherein the right part of the right FOV extends horizontally towards a left side of the gaze point of the right FOV till only a second predefined angle from the gaze point of the right FOV;

process the left image data and the right image data, to construct a left part of a left image and a right part of a right image, respectively;

reconstruct a right part of the left image, by reprojecting a corresponding part of the right image;

reconstruct a left part of the right image, by reprojecting a corresponding part of the left image;

generate the left image, by combining the constructed left part and the reconstructed right part of the left image; and generate the right image, by combining the reconstructed left part and the constructed right part of the right image.

2. An imaging system comprising:

a left image sensor and a right image sensor, forming a stereo pair; and at least one processor configured to:
obtain information indicative of a left gaze direction and a right gaze direction of a left eye and a right eye of a user, respectively;
determine a gaze point of a left field of view (FOV) of the left image sensor and a gaze point of a right FOV of the right image sensor, based on the left gaze direction and the right gaze direction, respectively;
read out left image data and right image data from the left image sensor and the right image sensor, respectively, wherein the left image data is read out from a left part of the left FOV, wherein the left part of the left FOV extends horizontally towards a right side of the gaze point of the left FOV till only a first predefined angle from the gaze point of the left FOV, while the right image data is read out from a right part of the right FOV, wherein the right part of the right FOV extends horizontally towards a left side of the gaze point of the right FOV till only a second predefined angle from the gaze point of the right FOV;
process the left image data and the right image data, to construct a left part of a left image and a right part of a right image, respectively; and
send the left part of the left image and the right part of the right image to at least one server or at least one display apparatus.

3. The imaging system of claim 2, wherein the at least one server is configured to:

reconstruct a right part of the left image, by reprojecting a corresponding part of the right image;

reconstruct a left part of the right image, by reprojecting a corresponding part of the left image;

generate the left image, by combining the constructed left part and the reconstructed right part of the left image;

generate the right image, by combining the reconstructed left part and the constructed right part of the right image; and send the left image and the right image to the at least one display apparatus.

4. The imaging system of claim 2, wherein the at least one display apparatus is configured to:

reconstruct a right part of the left image, by reprojecting a corresponding part of the right image;

reconstruct a left part of the right image, by reprojecting a corresponding part of the left image;

generate the left image, by combining the constructed left part and the reconstructed right part of the left image;

generate the right image, by combining the reconstructed left part and the constructed right part of the right image; and display the left image and the right image.

5. The imaging system of claim 1, wherein the first predefined angle and the second predefined angle lie within a range of 2 degrees to 22.5 degrees.

6. The imaging system of claim 1, wherein when reading out the left image data, the at least one processor is configured to employ spatially-variable subsampling across the left FOV, wherein a subsampling density employed for a gaze region surrounding the gaze point of the left FOV is higher than a subsampling density employed for a remaining region of the left FOV.

7. The imaging system of claim 1, wherein when reading out the right image data, the at least one processor is configured to employ spatially-variable subsampling across the right FOV, wherein a subsampling density employed for a gaze region surrounding the gaze point of the right FOV is higher than a subsampling density employed for a remaining region of the right FOV.

8. The imaging system of claim 1, further comprising at least one left optical element and at least one right optical element arranged on an optical path of the left image sensor and an optical path of the right image sensor, respectively, wherein the at least one processor is configured to:

control an orientation of the at least one left optical element to direct, towards the left image sensor, light incoming from an additional left FOV that extends beyond a left side of the left FOV, based on the gaze point of the left FOV; and control an orientation of the at least one right optical element to direct, towards the right image sensor, light incoming from an additional right FOV that extends beyond a right side of the right FOV, based on the gaze point of the right FOV, wherein the left image data and the right image data are read out, respectively, from the additional left FOV and the additional right FOV also.

9. The imaging system of claim 1, further comprising at least one left optical element and at least one right optical element arranged on an optical path of the left image sensor and an optical path of the right image sensor, respectively, wherein the at least one processor is configured to:

control a lateral shift of the left image sensor with respect to the at least one left optical element, based on the gaze point of the left FOV; and control a lateral shift of the right image sensor with respect to the at least one right optical element, based on the gaze point of the right FOV.

10. The imaging system of claim 1, further comprising: at least one left optical element and at least one right optical element arranged on an optical path of the left image sensor and an optical path of the right image sensor, respectively, wherein the at least one processor is configured to:

adjust an orientation of the at least one left optical element and the left image sensor towards a left side of the left FOV, based on the gaze point of the left FOV, to enable capture of an additional left FOV that extends beyond the left side of the left FOV; and adjust an orientation of the at least one right optical element and the right image sensor towards a right side of the right FOV, based on the gaze point of the left FOV, to enable capture of an additional right FOV that extends beyond the right side of the right FOV.

11. An imaging method implemented by an imaging system comprising a left image sensor and a right image sensor, forming a stereo pair, the method comprising:
   obtaining information indicative of a left gaze direction and a right gaze direction of a left eye and a right eye of a user, respectively;
   determining a gaze point of a left field of view (FOV) of the left image sensor and a gaze point of a right FOV of the right image sensor, based on the left gaze direction and the right gaze direction, respectively;
   reading out left image data and right image data from the left image sensor and the right image sensor, respectively, wherein the left image data is read out from a left part of the left FOV, wherein the left part of the left FOV extends horizontally towards a right side of the gaze point of the left FOV till only a first predefined angle from the gaze point of the left FOV, while the right image data is read out from a right part of the right FOV, wherein the right part of the right FOV extends horizontally towards a left side of the gaze point of the right FOV till only a second predefined angle from the gaze point of the right FOV;
   processing the left image data and the right image data, to construct a left part of a left image and a right part of a right image, respectively;
   reconstructing a right part of the left image, by reprojecting a corresponding part of the right image;
   reconstructing a left part of the right image, by reprojecting a corresponding part of the left image;
   generating the left image, by combining the constructed left part and the reconstructed right part of the left image; and
   generating the right image, by combining the reconstructed left part and the constructed right part of the right image.

12. An imaging method implemented by an imaging system comprising a left image sensor and a right image sensor, forming a stereo pair, the method comprising:
   obtaining information indicative of a left gaze direction and a right gaze direction of a left eye and a right eye of a user, respectively;
   determining a gaze point of a left field of view (FOV) of the left image sensor and a gaze point of a right FOV of the right image sensor, based on the left gaze direction and the right gaze direction, respectively;
   reading out left image data and right image data from the left image sensor and the right image sensor, respectively, wherein the left image data is read out from a left part of the left FOV, wherein the left part of the left FOV extends horizontally towards a right side of the gaze point of the left FOV till only a first predefined angle from the gaze point of the left FOV, while the right image data is read out from a right part of the right FOV, wherein the right part of the right FOV extends horizontally towards a left side of the gaze point of the right FOV till only a second predefined angle from the gaze point of the right FOV;
   processing the left image data and the right image data, to construct a left part of a left image and a right part of a right image, respectively; and
   sending the left part of the left image and the right part of the right image to at least one server or at least one display apparatus.

13. The method of claim 11, wherein the imaging system further comprises at least one left optical element and at least one right optical element arranged on an optical path of the left image sensor and an optical path of the right image sensor, respectively, wherein the method further comprises:
   controlling an orientation of the at least one left optical element to direct, towards the left image sensor, light incoming from an additional left FOV that extends beyond a left side of the left FOV, based on the gaze point of the left FOV; and
   controlling an orientation of the at least one right optical element to direct, towards the right image sensor, light incoming from an additional right FOV that extends beyond a right side of the right FOV, based on the gaze point of the right FOV,
   wherein the left image data and the right image data are read out, respectively, from the additional left FOV and the additional right FOV also.

14. The method of claim 11, wherein the imaging system further comprising at least one left optical element and at least one right optical element arranged on an optical path of the left image sensor and an optical path of the right image sensor, respectively, wherein the method further comprises:
   controlling a lateral shift of the left image sensor with respect to the at least one left optical element, based on the gaze point of the left FOV; and
   controlling a lateral shift of the right image sensor with respect to the at least one right optical element, based on the gaze point of the right FOV.

15. The method of claim 11, wherein the imaging system further comprises at least one left optical element and at least one right optical element arranged on an optical path of the left image sensor and an optical path of the right image sensor, respectively, wherein the method further comprises:
   adjusting an orientation of the at least one left optical element and the left image sensor towards a left side of the left FOV, based on the gaze point of the left FOV, to enable capture of an additional left FOV that extends beyond the left side of the left FOV; and
   adjusting an orientation of the at least one right optical element and the right image sensor towards a right side of the right FOV, based on the gaze point of the left FOV, to enable capture of an additional right FOV that extends beyond the right side of the right FOV.

\* \* \* \* \*